United States Patent [19]

Toyomasa

[11] Patent Number: 5,373,753
[45] Date of Patent: Dec. 20, 1994

[54] POWER TRANSMISSION DEVICE

[76] Inventor: Hiroshi Toyomasa, 16-63, Mishima 3-chome, Settsu-shi, Osaka, Japan

[21] Appl. No.: 86,997

[22] Filed: Jul. 8, 1993

[30] Foreign Application Priority Data

Feb. 25, 1993 [JP] Japan .................................. 5-036657

[51] Int. Cl.⁵ ..................... F16H 1/16; F16H 55/24; F16H 55/10
[52] U.S. Cl. ........................... 74/396; 74/425; 74/458
[58] Field of Search ..................... 74/396, 425, 458

[56] References Cited

U.S. PATENT DOCUMENTS

| | | | |
|---|---|---|---|
| 2,403,096 | 7/1946 | Slavic | 74/458 X |
| 2,664,760 | 1/1954 | Booth | 74/458 |
| 3,463,030 | 8/1969 | Nuccel | 74/458 X |
| 5,090,266 | 2/1992 | Otsuka | 74/458 X |

FOREIGN PATENT DOCUMENTS

| | | | |
|---|---|---|---|
| 238448 | 9/1987 | European Pat. Off. | 74/425 |
| 61-180046 | 8/1986 | Japan | 74/425 |

*Primary Examiner*—Allan D. Herrmann
*Attorney, Agent, or Firm*—Wenderoth, Lind & Ponack

[57] ABSTRACT

A driving force transmission device includes a worm meshing with a worm wheel. The worm has an outer casing defining a first helical groove on the outer peripheral surface thereof, and an inner cylinder mounted in the outer casing and provided on the outer peripheral surface thereof with a helical groove. The outer casing has ball transfer holes at both ends of the first groove and which transfer holes communicate with the helical groove in the inner cylinder. A plurality of balls are rollably and loosely fitted in the helical groove in the outer periphery of the inner cylinder, the first groove in the outer periphery of the outer casing and the second groove in the outer periphery of the worm wheel. The balls circulate between the helical groove in the outer periphery of the inner cylinder and the first helical groove in the outer periphery of the outer casing via the ball transfer holes. Frame rings mounted on the worm at both ends thereof prevent the balls from floating out of the first groove.

3 Claims, 6 Drawing Sheets

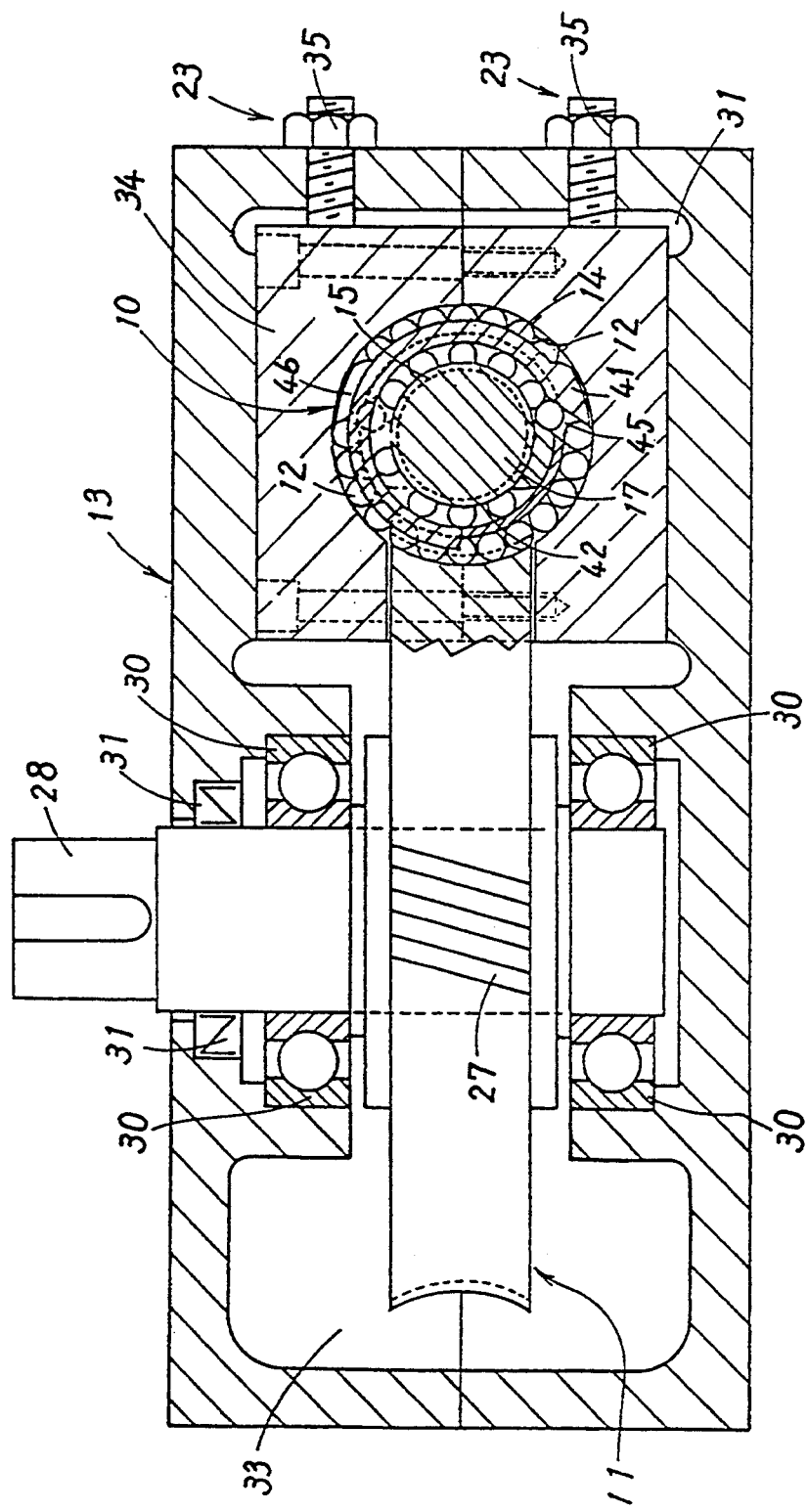

POWER TRANSMISSION DEVICE

BACKGROUND OF THE INVENTION

The present invention relates to a power transmission device such as a worm gear serving as a speed reducing mechanism.

First, we shall describe a conventional power transmission device in the form of a worm gear. As shown in FIG. 9, a conventional worm gear comprises a worm 2 having helical threads 1 and a worm wheel 4 having teeth 3 meshing with the threads 1.

As the worm 2 rotates, the threads 1 of the worm 2 engage the teeth 3 of the worm wheel 4, so that the worm wheel 4 will rotate.

With this device, since the threads 1 of the worm 2 mesh directly with the teeth of the worm wheel, the efficiency of torque transmission is low and large energy is required to rotate them.

Also, much heat is produced due to friction. The heat increases the possibility of seizure. Such a worm wheel is thus made of a bronze light alloy (an alloy such as gun metal). Thus, the strength and durability of the teeth 3 were poor.

In order to reduce heat generation and improve durability, it was proposed (in Japanese Examined Patent Publication 38-22759) to interpose balls 5 between the worm 2 and the worm wheel 4 as shown in FIG. 10.

With the conventional worm gear shown in FIG. 10, the gap between a cylinder 7 and the worm wheel 4 had to be kept to a minimum in order to prevent the balls 5 from floating up markedly out of grooves 6a and 6b formed in the worm 2 and the worm wheel 4, respectively. For this purpose, as shown in FIG. 11, the worm 2 had an hourglass shape corresponding to the radius of curvature of the worm wheel 4. But this structure has a drawback in that, since the diameter of the worm 2 is greater at its ends than at its central portion, the inclination of the ball rolling groove 6a in the worm 2 changes from the center toward both ends as shown in FIG. 11. Namely, it was difficult in design to form the groove 6a in the worm 2 and the grooves 6b in the worm wheel 4 so that they will coincide with each other. This in turn hampers smooth movement of balls while the gear is being driven.

SUMMARY OF THE INVENTION

An object of the present invention is to provide a driving force transmission device which can prevent the balls from floating up out of the groove formed in the worm, thereby assuring smooth driving.

The power transmission device of the present invention comprises, as shown in FIGS. 1 and 2, a worm provided on the outer peripheral surface thereof with a helical first groove having a substantially arcuate section, a worm wheel provided on the outer peripheral surface thereof with a second groove having a substantially arcuate section and opposed to the first groove, the worm being formed with a passage through which balls are transferred between one end and the other end of the first groove, a plurality of balls rollably and loosely fitted in the passage, the first groove and the second groove, and frame rings mounted on the worm at both ends thereof for preventing the balls from floating out of the first groove.

The device of the present invention may comprise a structure wherein the worm and the worm wheel are mounted in a speed reducer case, wherein the worm wheel has a worm wheel shaft rotatably journaled in the speed reducer case, wherein the worm has a worm shaft rotatably journaled in the speed reducer case, and wherein the speed reducer case is provided with adjusting means for adjusting the force between the worm and the worm wheel.

The device of the present invention may comprise a structure wherein the worm comprises an outer casing provided on the outer peripheral surface thereof with a helical first groove, and an inner cylinder mounted in the outer casing and provided on the outer peripheral surface thereof with a helical groove, the outer casing being formed with ball transfer holes at both ends of the first groove and communicating with the helical groove formed in the inner cylinder.

The device of the present invention may comprise positioning means for positioning the outer casing relative to the inner cylinder so that they will not rotate relative to each other, the positioning means comprising a recess formed in one of the outer casing and the inner cylinder and a projection formed on the other of the outer casing and the inner cylinder and received in said recess.

As the worm rotates, its driving force is transmitted to the worm wheel through the balls. When the balls separate from the second groove, they will tend to come away from the first groove because the ends of the worm are not in tight contact with the worm wheel. However, the frame rings provided at both ends of the worm prevents the balls from floating up out of the first groove.

If the meshing engagement between the worm and the worm wheel loosens so backlash occurs such backlash between the worm and worm wheel can be eliminated by finely adjusting the force between the worm and the worm wheel with the adjusting means, so that the idling of the balls can be prevented.

In the second embodiment, by the provision of the helical passage in the surface of the inner cylinder, the balls can roll smoothly. By inserting the inner cylinder into the outer casing so that the projection is received in the recess, they can be positioned with respect to each other. Thus, they can be positioned so that the first groove communicates with the passage through the communicating holes. In other words, it is possible to prevent the communicating holes and the passage from shifting relative to each other. Thus, the balls can roll smoothly between the first groove and the passage.

Since it is not necessary to form the worm in the shape of an hourglass according to the curvature of the worm wheel, it is possible to form the ball rolling groove of the worm and the ball rolling groove of the worm wheel so that they coincide only partially with each other. Thus, the balls can be moved smoothly while the gear is being driven. At portions where they are not in juxtaposition, the balls are prevented from floating by the frame rings.

This means that the distance between axes does not have to be set so accurately and thus no higher machining accuracy is required. This makes it possible to improve the yield and reduce the production cost.

BRIEF DESCRIPTION OF THE DRAWINGS

Other features and objects of the present invention will become apparent from the following description made with reference to the accompanying drawings, in which:

FIG. 6 is a sectional side view of the second embodiment of the driving force transmission device;

DETAILED DESCRIPTION OF THE PREFERRED EMBODIMENTS

First Embodiment

Figure 1:
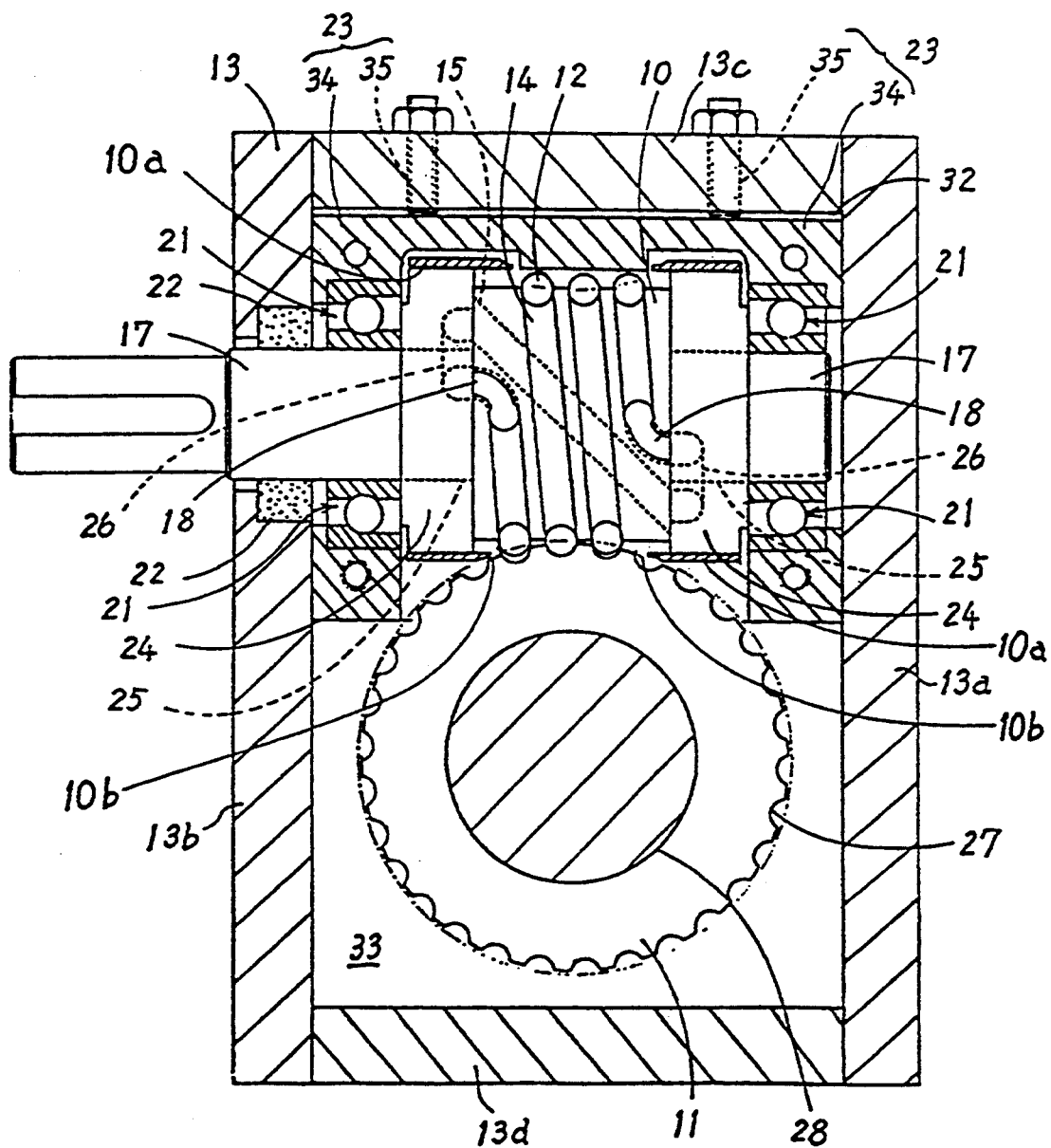
FIG. 1 is a sectional front view of the first embodiment of the driving force transmission device of the present invention.
Figure 2:
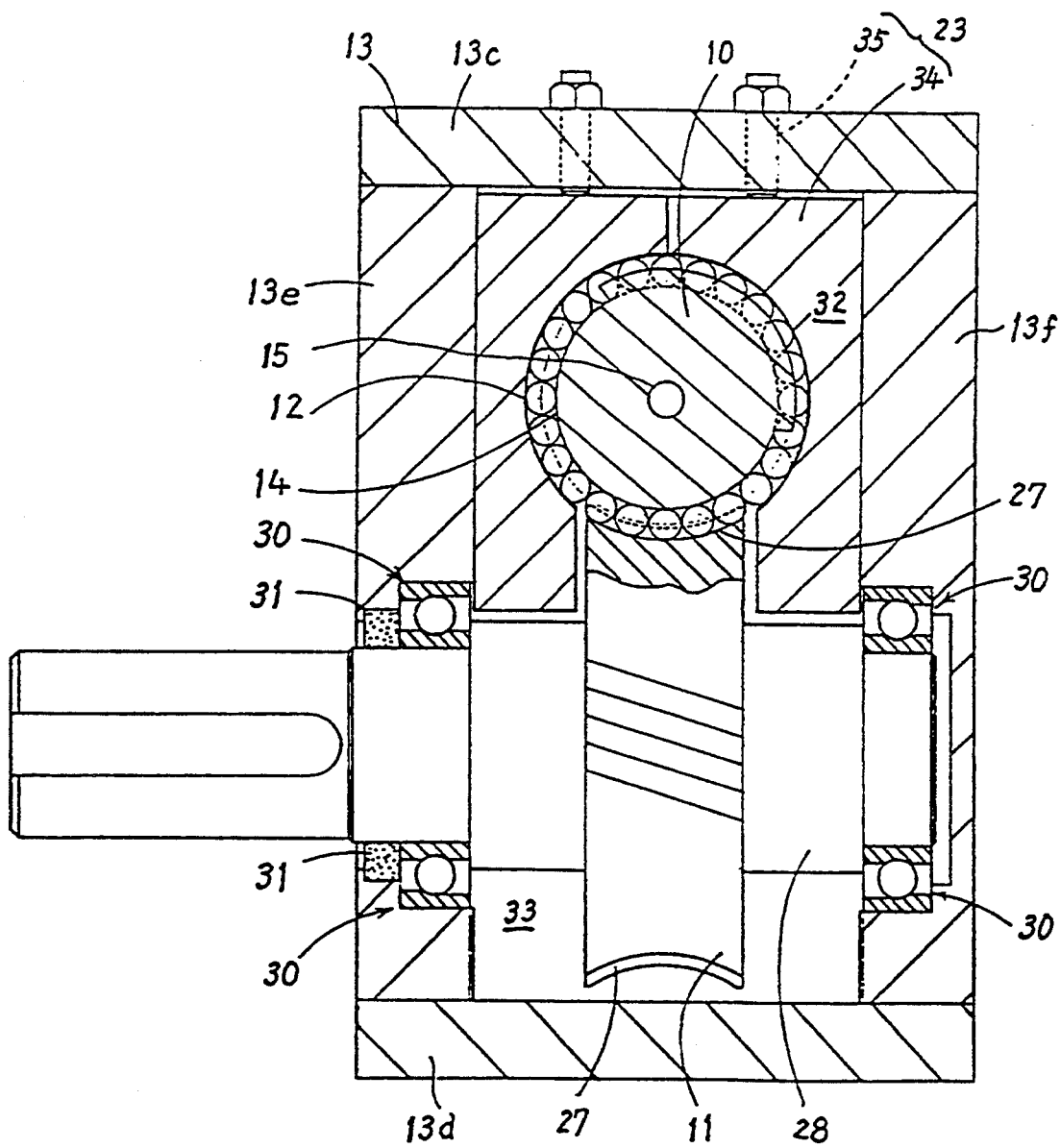
FIG. 2 is a sectional side view of the same.

The power transmission device (worm gear) of the first embodiment according to the present invention comprises, as shown in FIGS. 1 and 2, a worm 10, a worm wheel 11, balls 12 rollably retained in the meshing portions of the worm 10 and the worm wheel 21, frame rings 10a mounted on both ends of the outer periphery of the worm 10, and a speed reducer case 13 accommodating these members.

Figure 3:
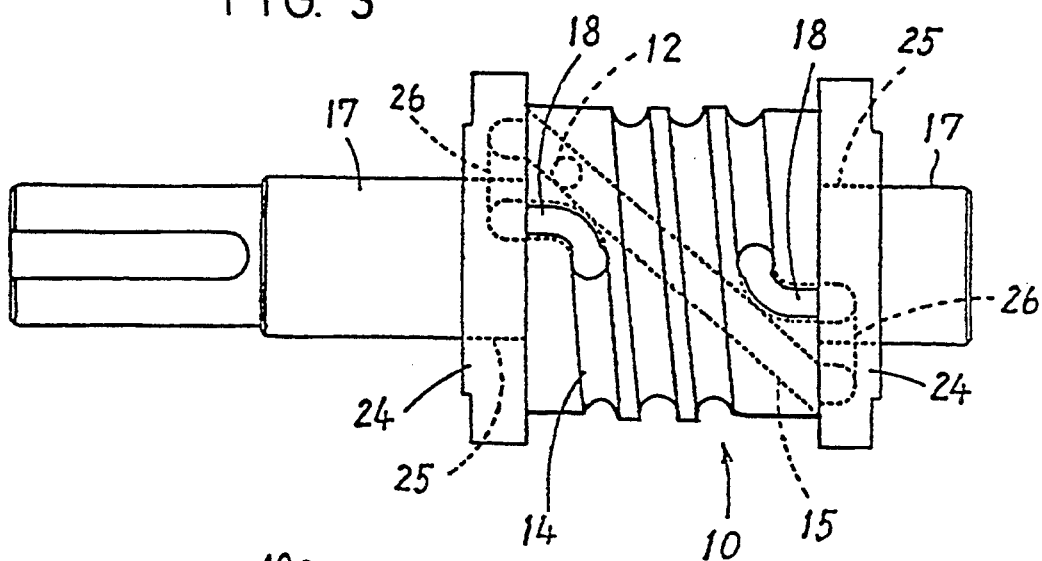
FIG. 3 is a front view of the worm of the first embodiment.

The worm 10 is, as shown in FIGS. 1-3, subjected to hardening after having been formed into a cylindrical shape.

A helical first groove 14 having substantially an arcuate section is formed in the outer periphery of the worm 10. The first groove 14 has a depth smaller than the radius of the balls 12.

Inside the worm 10 is formed a passage 15 through which balls 12 are passed between the front and rear ends of the first groove 14. The passage 15 is a straight through-hole that extends obliquely between both ends of the worm 10. In the embodiment of FIGS. 1 and 3, the passage 15 extends obliquely but it may extend perpendicular to both end faces.

As shown in FIG. 3, a worm shaft 17 as a rotary shaft protrudes from each end of the worm 10. Also, a ball transfer hole 18 is formed in each end thereof through which the balls 12 are passed between each transfer groove 26 which are to be described hereinbelow and the first groove 14.

As shown in FIG. 1, the worm shaft 17 is supported by the speed reducer case 13 through ball bearings 21 and its portion extending through the case is sealed by an oil seal 22. A slight gap is provided between the worm shaft 17 and the speed reducer case 13 so that the force of meshing engagement is adjustable by slightly moving the worm shaft 17 toward the worm wheel 11 by an adjusting means 23 which will be described hereinbelow.

Figure 5A:
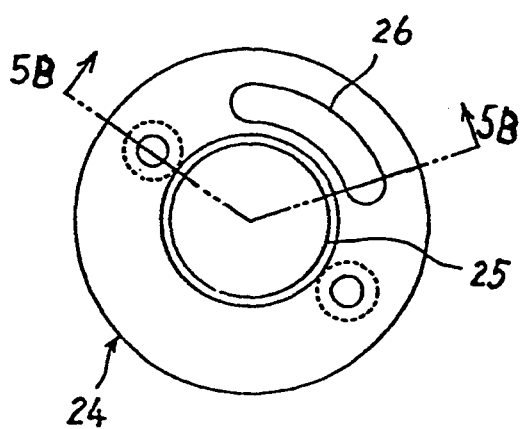
FIGS. 5A and 5B illustrate the side plates of the first embodiment, 5A being a side view and 5B being a sectional view taken along line 5B—5B of 5A.
Figure 5B:
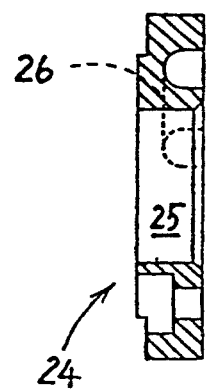

As shown in FIG. 3, a side plate 24 as a closing means for closing the ball transfer hole 18 is bolted or otherwise secured to each end face of the worm 10. As shown in FIGS. 5A, 5B, the side plates 24 are disks made of plastic or metal and having a diameter larger than that of the worm 10. They are provided in the center with a through-hole 25 through which the worm shaft 17 extends. Each side plate 24 is provided in its mounting face with the ball transfer groove 26 through which balls 12 are transferred between the ball transfer hole 18 and the passage 15. Portions of the ball transfer grooves 26 connecting to the ball transfer holes 18 and the passage 15 have a slightly enlarged diameter so that the balls 12 can be transferred smoothly between these parts.

The worm wheel 11 is, as shown in FIGS. 1 and 2, made of hardened steel as is the worm 10 and is provided with a second groove 27 having substantially arcuate section and extending over the entire circumference of the worm wheel. The groove 27 can receive the balls 12 received in the first groove 14 of the worm 10. To the center of the worm wheel 11 is fixed a worm wheel shaft 28 rotatably journaled in the speed reducer case 13.

The second groove 27 extends in the same direction (that is, with the same lead) as the first groove 14 and as shown in FIG. 1, its depth is smaller than the radius of the balls 12. The worm wheel shaft 28 is, as shown in FIG. 2, supported on the speed reducer case 13 through ball bearings 30. Its portion passing through the case is sealed by an oil seal 31.

The balls 12 are metal balls, the number of which is determined so that they are arranged in the first groove 14, ball transfer groove 26 and passage 15 with slight gaps provided between the adjacent balls.

Figure 4:
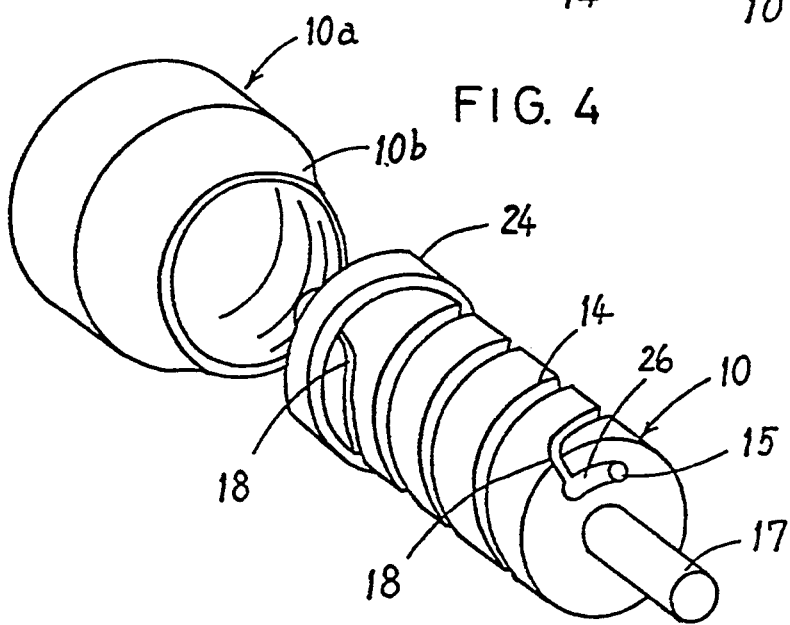
FIG. 4 is an exploded perspective view showing the relation between the worm and the frame rings of the first embodiment.

The frame rings 10a serve to prevent the balls 12 from floating markedly out of the first groove 14 when they separate from the second groove 27. As shown in FIG. 4, they are made of metal or plastic and are mounted on the side plates 24 at both sides of the worm 10. Since the side plates 24 have a greater diameter than the worm 10 as shown in FIG. 1, a gap large enough to receive the balls 12 is defined between the frame rings 10a and the worm 10.

Each frame ring 10a has an inclined surface 10b inclined arcuately to prevent it from abutting the worm wheel 11. Thus, once the frame rings 10a are mounted, the assembly presents an hourglass shape having arcuate portions corresponding to the curvature of the worm wheel 11.

The speed reducer case 13 comprises, as shown in FIGS. 1 and 2, a pair of side plates 13a, 13b, a top plate 15c, a bottom plate 13d, a front plate 13e and a back plate 15f, forming a box. Inside the case is provided a worm chamber 32 accommodating the worm 10 and a worm wheel chamber 33 accommodating the worm wheel 11, both chambers 32, 33 communicating with each other.

The speed reducer case 13 is provided with adjusting means 23 for adjusting the force between the worm 10 and the worm wheel 11. Each adjusting means 23 comprises a presser 34 (or worm shaft case) for urging the worm 10 toward the worm wheel 11 and four adjusting screws 35 for slightly moving the presser 34 toward the worm wheel 11.

The presser 34 has a cylindrical hole to receive the balls 12 and surrounds the worm 10 nearly completely (FIG. 2) so that the balls 12 can move smoothly without floating up out of the groove 14. The worm 10 is urged toward the worm wheel 11 by the presser 34 through the balls 12. The presser 34 supports the worm 10 through the ball bearings 21.

The adjusting screws extend through the top wall as shown in FIGS. 1 and 2 and abut the presser 34.

Next, we will describe how the worm gear is used. As the worm shaft 17 is rotated, the worm 10 integral with the shaft 17 will rotate.

The balls 12 will roll so that the driving force for the worm 10 is transmitted to the worm wheel 11 through the balls 12 where the worm 10 and the worm wheel 11 are engaged. The worm wheel 11 thus rotates.

Because the worm 10 and worm wheel 11 mesh with each other, the balls 12 roll and circulate through the first groove 14, ball transfer groove 26, passage 15 and again through the groove 26 and then first groove 14.

Since the torque of the worm 10 is transmitted to the worm wheel 11 through the balls 12, friction and thus heat generation can be kept to a minimum, so that the torque can be transmitted efficiently with minimum energy consumption.

When the balls 12 separate from the second groove 27, they have a tendency to come out of or float away from the first groove 14 because the ends of the worm 10 are not in tight contact with the worm wheel 11. However, the frame rings 10a provided on the ends of the worm 10 can prevent the balls 12 from floating markedly from the first groove 14.

Backlash between the worm 10 and the worm wheel 11 can be eliminated by tightening the adjusting screws 35 to urge the worm 10 toward the worm wheel 11 through the presser 34. In contrast, if they are pressed against each other too tightly, the adjusting screws 35 have to be loosened.

Second Embodiment

Figure 7:
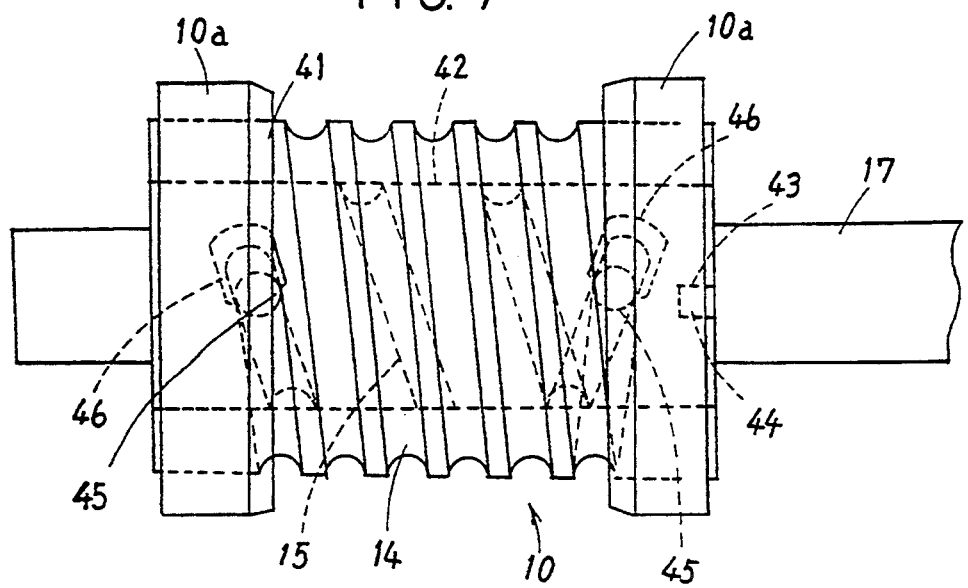
FIG. 7 is a front view of the outer casing of the worm of the second embodiment.
Figure 8:
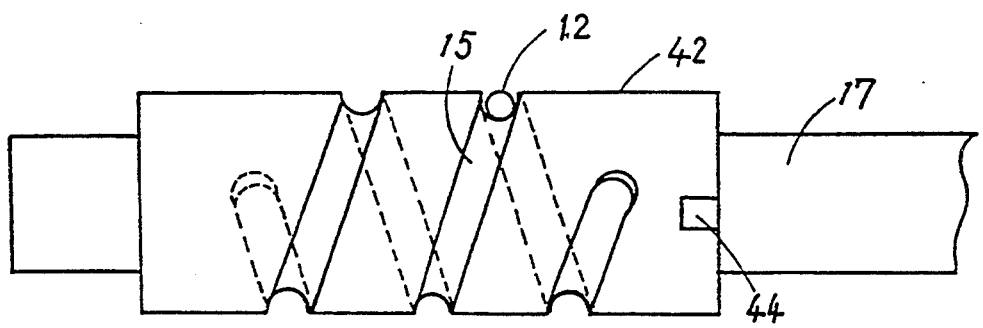
FIG. 8 is a front view of the inner cylinder of the worm of the second embodiment.
Figure 9:
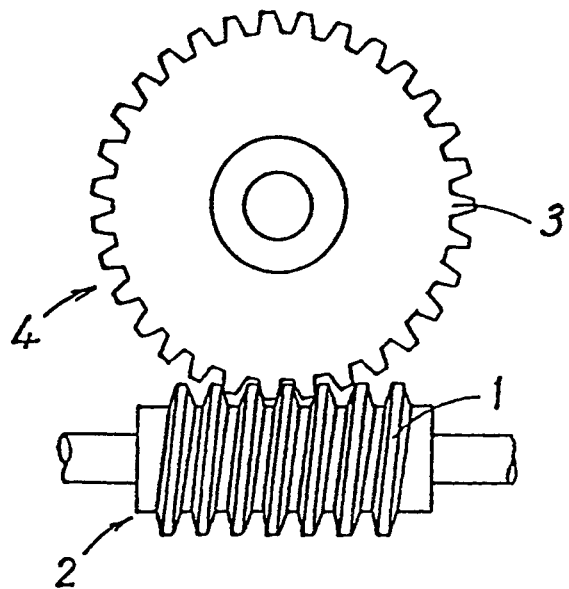
FIG. 9 is a view of a conventional worm gear.
Figure 10:
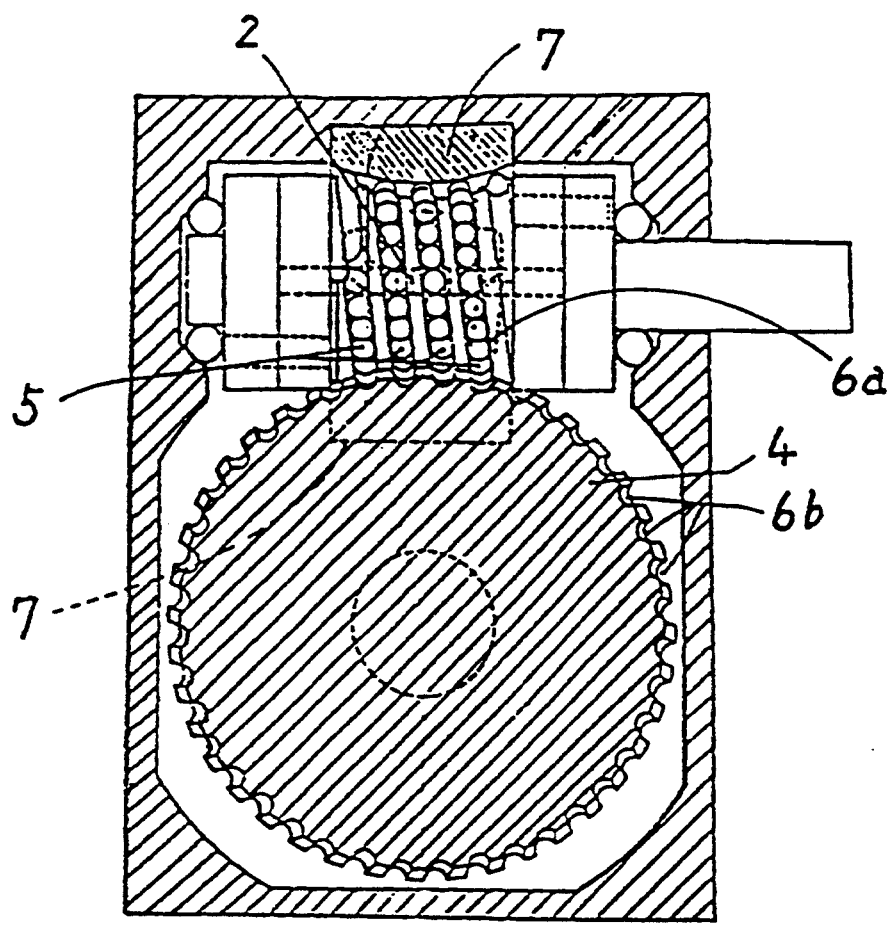
FIG. 10 is a sectional view of another conventional worm gear.
Figure 11:
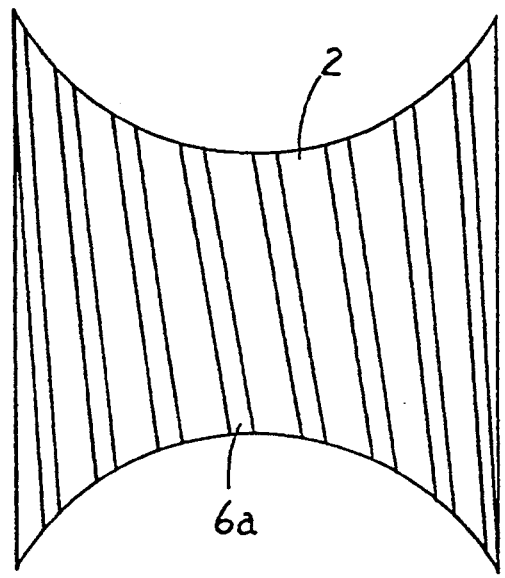
FIG. 11 is a side view of a conventional worm.

The second embodiment has a worm 10 comprising, as shown in FIGS. 6, 7 and 8, an outer casing 41 having a helical first groove 14 on its outer periphery and an inner cylinder 42 fitted in the outer casing 41 and provided on its outer periphery with a passage 15 in the form of a helical groove.

The outer casing 41 has an inner diameter equal to the outer diameter of the inner cylinder 42. They are press-fitted together. For properly positioning the outer casing 41 on the inner cylinder 42, the former has a recess 43 in the inner periphery of one end thereof from which the inner cylinder 42 is to be inserted, while the inner cylinder 42 is provided on the outer surface thereof with a protrusion 44 which is fitted in the recess 43 formed in the outer casing 41.

The outer casing 41 is provided at both ends of the first groove 14 with holes 45 which communicate with the passage 15 of the inner cylinder 42. A guide protrusion 46 is provided at the junction between the first groove 14 and each hole 45 to smoothly guide the balls 12 between the first groove 14 and the holes 45.

The passage 15 of the inner cylinder 42 extends in the direction or lead opposite to the first groove 14. Both ends of the passage 15 connecting with the holes 45 are formed slightly wider to guide the balls 12 smoothly.

A worm shaft 17 is integrally fixed to both ends of the inner cylinder 42.

Other structural features of this embodiment are the same as those of the first embodiment. For example, this embodiment has frame rings 10a mounted on both ends of the worm 10 and adjusting means 23 for fine adjustment of the force between the worm 10 and worm wheel 11.

The worm gear of the second embodiment is assembled in the following manner. First, the inner cylinder 42 is inserted in the outer casing 41. They are positioned with respect to each other so that the first groove 14 communicates with the passage 15 through the holes 45, by fitting the protrusion 44 on the inner cylinder 42 in the recess 43 formed in the outer casing 41. Then the worm 10 is mounted in the presser 34 of the speed reducer case 13.

Next, the balls 12 are inserted into the passage 15 from the holes 45 to fill the passage 15 and the first groove 14 in the outer casing 41 is filled with the balls 12. The presser 34 and the speed reducer case 13 are then closed and the worm shaft 17 and the worm wheel shaft 28 are sealed with oil seals 51. The worm gear is thus assembled.

In this embodiment, while the worm 10 is rotating, the balls 12 roll in the first groove 14 while being subjected to a load from the balls 12 rolling in the reverse direction. They are guided through the hole 45 into the passage 15 and return to the first groove 14 again through the hole 45 at the front end. The balls are thus circulated. Since the torque of the worm 10 is transmitted to the worm wheel 11 through the rolling balls 12, friction and thus heat generation can be reduced to a minimum, so that the torque can be transmitted efficiently with less energy consumption.

The present invention is not limited to the above embodiments. It is of course possible to make various modifications and alterations within the scope of the present invention.

In the above embodiments, the worm gear has been described as comprising the worm 10 and the worm wheel 11 but such is a mere example of the present invention.

Also, in the above embodiments, the first groove 14 has a substantially arcuate section. However, it may have a triangular, square or any other polygonal section.

Further, in the second embodiment, the frame rings 10a may be omitted.

In the first embodiment, the adjusting means 23 comprises the presser 34 and adjusting screws 35. However, the adjusting screws 35 may be replaced with members made of an elastic resin such as urethane or coil springs.

What is claimed is:

1. A driving force transmission device comprising: a worm having an outer casing defining on the outer peripheral surface thereof a helical first groove having a substantially arcuate section, and an inner cylinder mounted in said outer casing and provided on the outer peripheral surface thereof with a helical groove, said outer casing having ball transfer holes at both ends of said first groove and communicating with the helical groove in said inner cylinder; a worm wheel provided on the outer peripheral surface thereof with a second groove having a substantially arcuate section and opposed to said first groove; a plurality of balls rollably and loosely fitted in said helical groove in said inner cylinder, said first groove and said second groove; and frame rings mounted on said worm at both ends thereof for preventing the balls from floating out of said first groove.

2. A driving force transmission device as claimed in claim 1, and further comprising a speed reducer case in which said worm and said worm wheel are mounted, and adjusting means for adjusting the force between said worm and said worm wheel, and wherein said worm wheel has a worm wheel shaft rotatably journaled in said speed reducer case, and said worm has a worm shaft rotatably journaled in said speed reducer case.

3. A driving force transmission device as claimed in claim 1 further comprising positioning means for positioning said outer casing relative to said inner cylinder so that they will not rotate relative to each other, said positioning means comprising a recess formed in one of said outer casing and said inner cylinder and a projection formed on the other of said outer casing and said inner cylinder and received in said recess.

* * * * *